US009740592B2

(12) United States Patent
Amano et al.

(10) Patent No.: US 9,740,592 B2
(45) Date of Patent: Aug. 22, 2017

(54) SUPPORTING DEBUGGING OF PROGRAM AND GRAPHICAL USER INTERFACE FOR SUPPORTING DEBUGGING

(75) Inventors: Takehiko Amano, Kanagawa (JP); Susumu Fukuda, Kanagawa (JP); Kenya Ishimoto, Tokyo (JP); Ken Kumagai, Tokyo (JP); Mayumi Takahashi, Kanagawa (JP); Atsushi Yokoi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 899 days.

(21) Appl. No.: 13/593,523

(22) Filed: Aug. 24, 2012

(65) Prior Publication Data

US 2013/0111447 A1    May 2, 2013

(30) Foreign Application Priority Data

Oct. 27, 2011   (JP) .................................. 2011-235534

(51) Int. Cl.
*G06F 11/36* (2006.01)
*G06F 9/44* (2006.01)

(52) U.S. Cl.
CPC ...... *G06F 11/3636* (2013.01); *G06F 11/3664* (2013.01); *G06F 11/3676* (2013.01); *G06F 8/77* (2013.01); *G06F 11/3624* (2013.01)

(58) Field of Classification Search
CPC ...... G06F 8/00; G06F 11/362; G06F 11/3636; G06F 11/3692; G05B 17/02

(Continued)

(56) References Cited

U.S. PATENT DOCUMENTS 6,079,032 A * 6/2000 Peri ...................... G06F 11/3409
                                                              714/38.13
6,651,244 B1 * 11/2003 Smith et al. .................. 717/154
(Continued)

FOREIGN PATENT DOCUMENTS

JP         06-103113       4/1994
JP         09-212387       8/1997
(Continued)

OTHER PUBLICATIONS

Dictionary.com, "Define: While", http://dictionary.reference.com/browse/while?s=t, May 2012, Houghton Mifflin.*
(Continued)

*Primary Examiner* — Kenneth Tang
*Assistant Examiner* — Gilles Kepnang
(74) *Attorney, Agent, or Firm* — Marcia L. Doubet (57) ABSTRACT

The present invention provides for debugging a target program with a computer comprising a storage unit and a processing unit. In one aspect, this comprises: storing, in the storage unit, reliability information including the reliability of individual indices of classification items of the program; reading, by the processing unit, the reliability information of the target program from the storage unit and determining a reliable code area and an unreliable code area by using the reliability of the individual indices in the reliability information; and executing debugging of the debug target program only for the unreliable code area while omitting debugging of the reliable code area. A graphical user interface to support debugging of only unreliable code areas is also disclosed.

10 Claims, 4 Drawing Sheets

(58) Field of Classification Search
USPC .................................. 717/120, 124–131, 154
See application file for complete search history.

(56) References Cited

U.S. PATENT DOCUMENTS

| | | | | |
|---|---|---|---|---|
| 6,895,577 | B1* | 5/2005 | Noble | G06F 11/3676 714/38.12 |
| 7,272,823 | B2* | 9/2007 | Ball | G06F 11/3616 714/E11.22 |
| 7,725,881 | B2* | 5/2010 | Bhat et al. | 717/124 |
| 7,886,272 | B1* | 2/2011 | Episkopos et al. | 717/124 |
| 7,890,935 | B2* | 2/2011 | Bates | 717/129 |
| 8,225,274 | B2* | 7/2012 | Cowtan | 717/105 |
| 8,266,592 | B2* | 9/2012 | Beto et al. | 717/124 |
| 8,423,960 | B2* | 4/2013 | Farchi et al. | 717/124 |
| 8,473,907 | B1* | 6/2013 | Zandi | G06F 11/3616 714/38.1 |
| 8,607,198 | B2* | 12/2013 | Nir-Buchbinder et al. | 717/124 |
| 8,769,497 | B2* | 7/2014 | Welchman | G06F 11/3676 717/124 |
| 2003/0101437 | A1* | 5/2003 | Gritter | G06F 11/362 717/129 |
| 2003/0233636 | A1* | 12/2003 | Crawford | G06F 11/28 717/130 |
| 2004/0205717 | A1* | 10/2004 | Chiang | G06F 11/362 717/124 |
| 2004/0210876 | A1* | 10/2004 | Stall | G06F 11/3624 717/127 |
| 2005/0177820 | A1* | 8/2005 | Mei | G06F 11/3664 717/129 |
| 2005/0273757 | A1* | 12/2005 | Anderson | G06F 11/3636 717/100 |
| 2006/0195724 | A1* | 8/2006 | Filho | G06F 11/3466 714/35 |
| 2006/0225051 | A1* | 10/2006 | Kannan | G06F 9/542 717/129 |
| 2006/0288332 | A1* | 12/2006 | Sagar | G06F 9/526 717/124 |
| 2007/0061782 | A1* | 3/2007 | Schreiner et al. | 717/124 |
| 2007/0300209 | A1* | 12/2007 | Bates et al. | 717/129 |
| 2008/0109790 | A1* | 5/2008 | Farnham | G06F 11/3688 717/128 |
| 2008/0168428 | A1* | 7/2008 | Bates | G06F 11/3636 717/129 |
| 2008/0256393 | A1* | 10/2008 | Ur | G06F 11/3616 714/38.1 |
| 2009/0133041 | A1* | 5/2009 | Rahman | G06F 11/0709 719/318 |
| 2009/0144698 | A1* | 6/2009 | Fanning et al. | 717/120 |
| 2009/0172646 | A1* | 7/2009 | Cherkasov et al. | 717/130 |
| 2009/0254888 | A1* | 10/2009 | Nicholls | G06F 11/3664 717/129 |
| 2010/0180258 | A1* | 7/2010 | Takahashi | 717/124 |
| 2011/0029958 | A1* | 2/2011 | Kalra | G06F 11/362 717/129 |
| 2011/0047531 | A1* | 2/2011 | Wang | 717/130 |
| 2011/0055798 | A1* | 3/2011 | Kraft | G06F 8/77 717/100 |
| 2011/0197176 | A1* | 8/2011 | Muharsky et al. | 717/113 |
| 2011/0258579 | A1* | 10/2011 | Nanjundaswamy | G06F 11/362 715/810 |
| 2011/0307870 | A1* | 12/2011 | Stairs | G06F 11/362 717/128 |
| 2012/0017195 | A1* | 1/2012 | Kaulgud | G06F 11/3692 717/101 |
| 2012/0047486 | A1* | 2/2012 | Ashish | G06F 11/3624 717/106 |
| 2012/0124557 | A1* | 5/2012 | Khandelwal | G06F 11/3664 717/125 |
| 2012/0159452 | A1* | 6/2012 | DeLine et al. | 717/125 |
| 2012/0167052 | A1* | 6/2012 | Fjeldstad | G06F 11/3664 717/125 |
| 2012/0185829 | A1* | 7/2012 | Yaffe | G06F 11/362 717/125 |
| 2012/0266144 | A1* | 10/2012 | Halliday | G06F 8/00 717/129 |
| 2012/0272220 | A1* | 10/2012 | Calcagno | G06F 8/77 717/125 |
| 2012/0291012 | A1* | 11/2012 | Robison | G06F 8/30 717/120 |
| 2012/0304010 | A1* | 11/2012 | Opstad et al. | 714/34 |
| 2013/0117730 | A1* | 5/2013 | Wisniewski | 717/125 |
| 2013/0218307 | A1* | 8/2013 | Hoernicke | G05B 17/02 700/81 |

FOREIGN PATENT DOCUMENTS

| | | |
|---|---|---|
| JP | 11-272502 | 10/1999 |
| JP | 2001-043110 | 2/2001 |
| JP | 2002-108652 | 4/2002 |
| JP | 2004-252684 | 9/2004 |
| JP | 2005-141406 | 6/2005 |
| JP | 2005-316685 | 11/2005 |
| JP | 2005-316685 A | 11/2005 |
| JP | 2007-233754 | 9/2007 |
| JP | 2010-020494 | 1/2010 |

OTHER PUBLICATIONS

Bernhart, Mario et al. "Adopting code reviews for Agile software development." Aug. 2010. Agile Conference (AGILE), 2010. IEEE.*

* cited by examiner

SUPPORTING DEBUGGING OF PROGRAM AND GRAPHICAL USER INTERFACE FOR SUPPORTING DEBUGGING

CROSS REFERENCE TO RELATED APPLICATION

The present application claims priority of co-pending Japanese patent application 2011-235534, filed on Oct. 27, 2011.

BACKGROUND

The present invention relates to program debugging, and more particularly, to a technology for improving debugging efficiency by limiting the debug area of a program (code).

In developing software, target programs are increasing in size year by year. The target programs include, in addition to newly developed code, code developed on its own company and tested code, such as libraries developed by a third party.

Development and maintenance of software needs to include testing and debugging of programs. If all the code is debugged during the debugging, already-tested code is also included in the code debug area as the program size increases, which poses the problem of decreasing the debugging efficiency.

Japanese Unexamined Patent Application Publication No. 06-103113 (hereinafter, "the '113 publication") discloses a method for supporting difference test debugging, whereby whole or part of a program whose reliability is already ensured is excluded from the target of test debugging, thus allowing efficient debugging. The method provides a coverage-information storage file for an existing completed or half-completed program, sets information of a tested portion for all individual statements in the coverage-information storage file, and thereafter, for a change of the program, sets only the coverage information of the changed portion to an untested state, and executes debug testing only on the statements of the changed portion.

Japanese Unexamined Patent Application Publication No. 2002-108652 (hereinafter, "the '652 publication") discloses a program correlation detecting apparatus for reducing the burden of a debugging work and improving the efficiency of the debugging work. This apparatus divides target programs into groups by comparing the components necessary for creating the programs and outputs the result of grouping externally as the correlation of the programs. If the details of the programs match, repeated debugging work for the matched details is avoided so that the burden of the debugging work is reduced and the efficiency is improved.

Japanese Unexamined Patent Application Publication No. 11-272502 (hereinafter, "the '502 publication") discloses a software reliability evaluation apparatus that estimates the reliability of a program to be tested. This estimation method includes an acquisition step of executing testing of a target program and acquiring various items of information necessary for estimating the reliability of the target program and a determination step of determining whether to continue the testing on the basis of reliability estimated based on a reliability estimation model. The various items of information include bug detection information, testing time, the number of occurrences of software faults, the number of testers, test coverage, an application method that the user indicates, the range of application, and the kind of reliability estimation model applied.

BRIEF SUMMARY

In one aspect, the present invention provides a method for debugging a target program with a computer including a storage unit and a processing unit. The method comprises: storing, in the storage unit, reliability information including reliability of individual indices of classification items of the target program; reading, from the storage unit, the reliability information of the target program and calculating, from the reliability of the individual indices, reliability of individual code areas to thereby determine a reliable code area and an unreliable code area based on the reliability of the individual indices in the reliability information; and executing debugging, by the processing unit, of the target program only for the unreliable code area but not for the reliable code area. Accordingly, since debugging of the target program is executed only for the unreliable code area as determined using the reliability of the individual indices of the classification items, the debugging time of the entire program can be reduced and the reliability of debugging can be improved.

According to another aspect of the present invention, a graphical user interface (GUI) for supporting debugging of a target program with a computer including a storage unit and a processing unit is provided. To support the processing unit in determining, for a debug target program, a reliable code area and an unreliable code area by using reliability information stored in the storage unit, the reliability information including the reliability of individual indices of classified items of the program, and in executing debugging of only the unreliable code area, the GUI includes a display screen; a first window on the display screen, the first window displaying a plurality of code names on an execution path of the debug target program; a second window on the display screen, the second window being capable of displaying a code area corresponding to a code name selected from the plurality of code names in the first window; and a slider display portion on the display screen, for each of the plurality of code names in the first window or the code area displayed in the second window, the slider display portion being for selectively changing a color displaying the code names or the code area, depending on the reliability of the corresponding code names or code area. According to this aspect of the present invention, since reliable or unreliable code and code areas of the target program can be visually clearly ascertained, the efficiency and reliability of the debugging work can be improved.

DETAILED DESCRIPTION

In the method of the '113 publication, only a statement in a changed portion of the program is tested for debugging.

Accordingly, this method has a high risk that a code area that needs debugging other than the changed portion is omitted from debugging, which causes insufficient debugging of the entire program, thus decreasing the reliability.

In the apparatus of the '652 publication, if the details of the programs are the same, repetition of debugging work on the same details is avoided. Accordingly, if the details of the programs are not the same, this apparatus cannot reduce the burden of the debugging work and improve the work efficiency.

The apparatus of the '502 publication determines whether to continue testing depending on reliability estimated on the basis of a reliability estimation model. However, since this apparatus does not limit the debug area of the program, there is a high possibility that an improvement in debugging efficiency is insufficient.

Accordingly, the present invention is directed to solving or reducing problems of the prior art and to improving debugging efficiency by limiting the debug area of a program (code).

Figure 1:
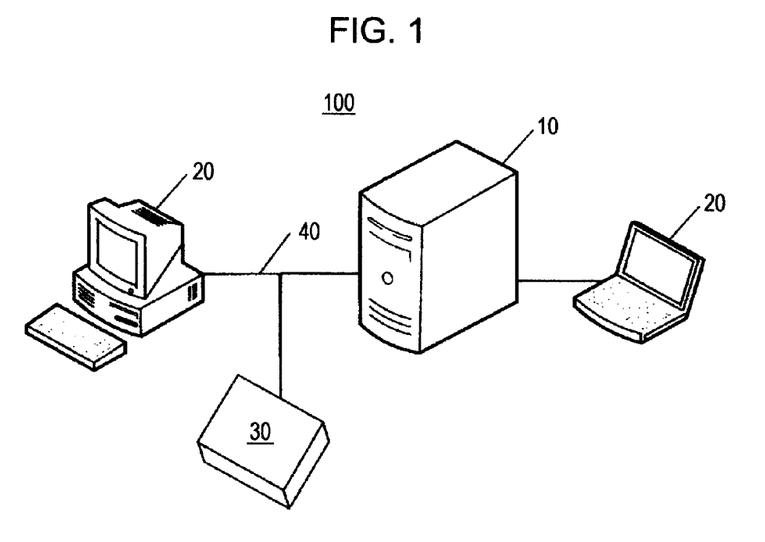
FIG. 1 is a diagram illustrating an example of the configuration of a system for executing a debugging method of the present invention.

An embodiment of the present invention will be described with reference to the drawings. FIG. 1 is a diagram illustrating an example of the configuration of a system 100 for executing a debugging method of the present invention. The system 100 includes a host (server) 10, PCs (terminals) 20, and a network drive 30 which are connected via a network 40 so as to communicate with each other. The network drive 30 includes storage means, such as a hard disk drive (HDD) and a tape drive. Although only one host (server) 10 and one network drive 30 are shown in FIG. 1, this is merely an example; as will be obvious, two or more hosts (servers) 10 and network drives 30 can be included.

The debugging method of the present invention is executed in the configuration of FIG. 1 when the PC 20 implements debugging software that is downloaded from the server 10 or the network drive 30 or debugging software that is stored in its own storage means (HDD or the like). The program (code) to be debugged is also downloaded from the server 10 or the network drive 30 by the PC 20 or called from its own storage means. As will be obvious, the debugging method of the present invention can be executed by a standalone PC that is not connected to a network.

Figure 2:
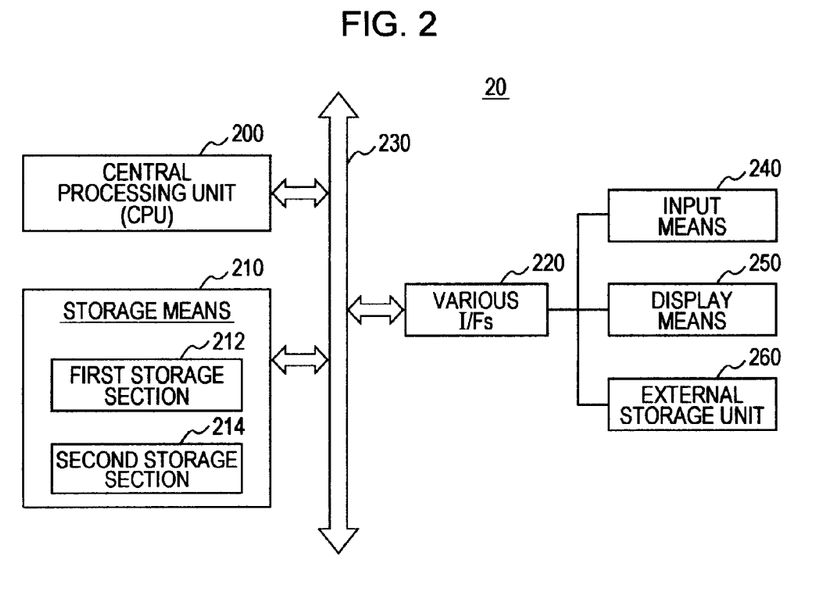
FIG. 2 is a block diagram showing an example of the configuration of a debugging apparatus of the present invention.

FIG. 2 is a block diagram showing an example of the configuration of a debugging apparatus of the present invention. The debugging apparatus corresponds to the PC 20 in the configuration of FIG. 1. The debugging apparatus 20 includes a central processing unit (CPU) 200, storage means 210, and various interfaces (I/Fs) 220 which are connected with each other via a bus 230. The term "various I/Fs 220" is used herein as a generic name for an input I/F, an output I/F, an external storage I/F, an external communication I/F, and so on. The individual I/Fs are connected to input means 240, such as a keyboard and a mouse; display means 250, such as a cathode ray tube (CRT) and a liquid crystal display (LCD); external storage means 260, such as a Universal Serial Bus (USB)-connected semiconductor memory and an HDD; and so on.

The storage means 210 includes a semiconductor memory, such as a random access memory (RAM) and a read-only memory (ROM), and a HDD. The storage means 210 has a first storage section 212 and a second storage section 214. The storage sections 212 and 214 can be provided in single storage means or a plurality of storage means. The first storage section 212 stores first reliability information including the reliability of individual indices of the classification items of the program. The second storage section 214 stores second reliability information including the reliability of the individual code areas calculated from the reliability of the individual indices stored in the first storage section 212.

Figure 3:
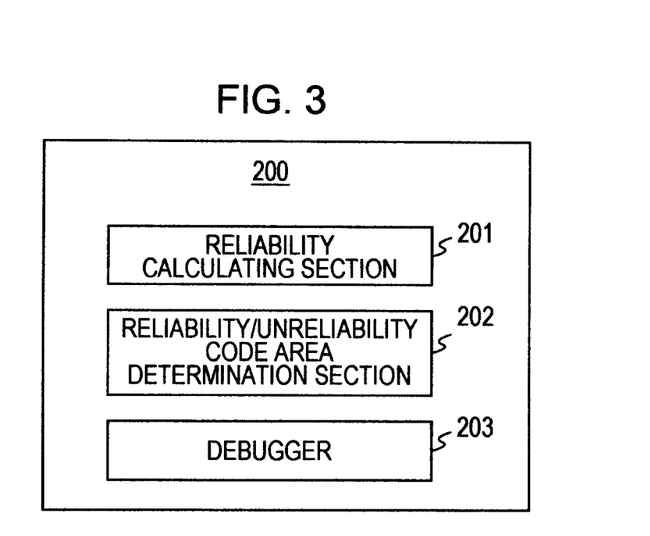
FIG. 3 is a functional block diagram of a processing unit of the present invention.

FIG. 3 is a functional block diagram of the central processing unit 200 in FIG. 2. The central processing unit 200 performs the functions in FIG. 3 for a program to be debugged by implementing debugging software according to the debugging method of the present invention. A reliability calculating section 201 calculates the reliability of individual code areas from the reliability of the indices of the program classification items stored in the first storage section 212. A reliability/unreliability code area determination section 202 determines a reliable code area and an unreliable code area of the target program on the basis of the reliability of the individual code areas stored in the second storage section 214. A debugger 203 executes debugging of the unreliable code area of the target program.

Terms used in the description of the present invention and the individual blocks in FIG. 3 will now be described. First, the reliability of the individual indices of the program classification items stored in the first storage section 212 will be described. The program classification items are set as initial information and refer to items (classification items) for classifying the program, such as metadata including program name, a changed portion, and a tag added by the user. The classification items may also include a human factor, such as information pertaining to a programmer (code creator). Generally, factors that influence the debugging efficiency can be added as classification items.

Examples of the indices of the classification items include, for classification by name, a name space (for example, package name in Java®), directory name, and file name. ("Java" is a registered trademark of Oracle Corporation in the United States, other countries, or both.) Examples of indices of classification by changed portion include whether it is a file in a changeset, whether it is a source under edition in its own workspace, whether it is changed at the specified date, and whether it is changed after a baseline or a milestone. The classification by human factor may use the results of past work of the programmer or software house, or the years of experience of the programmer or software house.

The reliability of the individual indices of the classification items refers to the reliability of the individual classified programs (code), in other words, the necessity (importance) of debugging, expressed in, for example, percentage (%). In the case where the reliability is expressed in percentage (%), the reliability increases as the percentage (%) increases. For a name space, for example, the reliability may be set as follows: a reliability of 96% for a package from company A, a reliability of 80% for a package from company B, and a reliability of 50% for a package under development. For a file in a changeset, the reliability may be set to, for example, a reliability of 50%, as in the case of a package under development.

Next, the reliability of individual code areas, which is calculated by the reliability calculating section 201 and stored in the second storage section 214, will be described. The reliability of individual code areas serves as a reference for determining whether the code area is a reliable code area or an unreliable code area. Here, the code area is defined as a unit whose reliability is set to indicate whether debugging is to be actually performed. The size (area) indicated as reliable/unreliable can be freely determined, from a line of code to a single file or package.

The reliability of the individual code areas is determined on the basis of the reliability of the individual indices of the classification items. For example, the reliability of a code (file) in a package under development and in a changeset may be calculated as 25% (=0.5×0.5) by multiplying the reliability of 50% of the package under development by the reliability 50% of the file in the changeset. In this case, although the reliability of two indices is multiplied together, the product may also be multiplied by a weighting factor, or a weighting factor may be added thereto. The reliability may also be calculated by using a given function instead of by multiplication. The reliability of the individual indices of the classification items can also be used as the reliability of the corresponding code areas. For the entire package under development, the reliability may be calculated for each of a developed and debugged code area (for example, a reliability of 80%) and the remaining code area (for example, a reliability of 50%).

Although the reliability of the individual code areas, described above, is principally calculated in advance before (or at) debugging and stored in the second storage section 214, the values may also be calculated and updated during debugging. For example, if there is a problem in the course of implementation of debugging, the reliability of the code area on the execution path until that time (i.e., until reaching that point on the execution path) may be recalculated so as to decrease in reliability, the updated reliability may be stored, and the reliability of the following code area on the execution path can also be reexamined. For step-in and step-out operations during debugging, the reliability of a specific execution path at the step-in and step-out operations can also be updated during a debugging work. This allows reliability that more suitably reflects the actual state of debugging to be calculated (updated) and stored.

Determination of a reliable code area and an unreliable code area by the reliability/unreliability code area determination section 202 will now be described. The reliable code area and the unreliable code area are determined depending on whether the calculated reliability of the individual code areas is within a predetermined range. For example, a code area with a reliability of 75% or higher can be determined as a reliable code area, and a code area with a reliability equal to or lower than that, or alternatively 50% or lower, can be determined as an unreliable code area. The predetermined range can be individually set in units of packages or in units of predetermined sets of code. A code area whose reliability is not set (calculated) for some reason is, in principle, determined as an unreliable code area.

A debugging operation of the debugger 203 will now be described. After the process of debugging is started, the debugger 203 performs notification of the position of a breakpoint, execution of the step, and instruction to restart the process only for an unreliable code area. Specifically, the debugging operation is performed as follows:

(a) The debugger 203 indicates the position of a breakpoint to the target process classified as the unreliable code area.

(b) The target process executes the process to the indicated breakpoint and notifies the debugger 203 that the process is stopped at the breakpoint.

(c) The debugger 203 issues an instruction to execute the step to the next execution position on the basis of reliability information or issues an instruction to restart the process without regard to the reliability information, as before.

(d) The target process executes the step or restarts the process in accordance with the instruction.

The execution of step, step-in, and step-out, by the debugger 203 is performed as follows:

<Step-In>

(a) The debugger 203 instructs the target process to execute step-in.

(b) The target process executes step-in and notifies the debugger 203 of a stop position.

(c) The debugger 203 determines the stop position on the basis of information of a reliable code area and an unreliable code area. That is, if the stepped-in position is in the unreliable code area, the debugger 203 stops the process at that position. If the stepped-in position is in the reliable code area, the debugger 203 instructs the target process to execute step-out and stops the process at a position at which the process has reached the unreliable code area.

<Step-Out>

(a) The debugger 203 instructs the target process to execute step-out.

(b) The target process executes step-out and notifies the debugger 203 of a stop position.

(c) The debugger 203 determines the stop position on the basis of information of a reliable code area and an unreliable code area. That is, if the stepped-out position is in the unreliable code area, the debugger 203 stops the process at the position. If the stepped-out position is in the reliable code area, the debugger 203 instructs the target process to restart the process and stops the process at a position at which the process has reached the unreliable code area.

Figure 4:
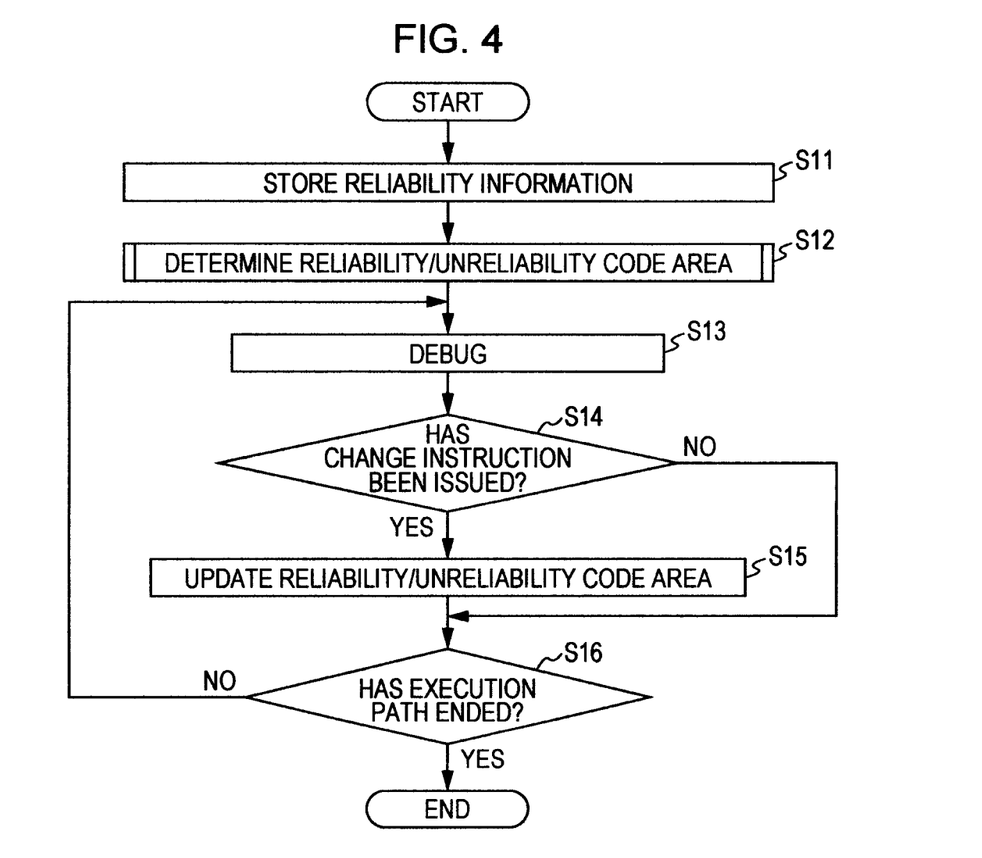
FIG. 4 is a diagram showing an example of the flow of a debugging method of the present invention.
Figure 5:
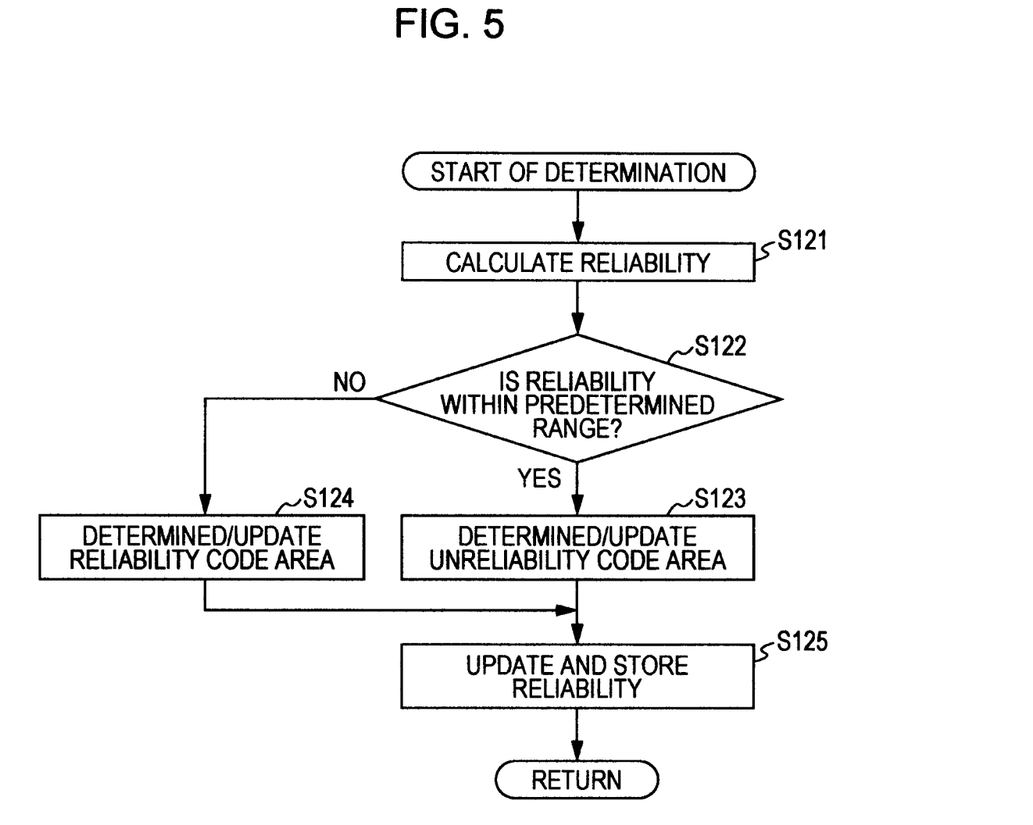
FIG. 5 is a diagram showing an example of the flow of the debugging method of the present invention.

Next, the flow of the debugging method of the present invention will be described with reference to FIGS. 4 and 5. FIG. 4 shows the entire flow, and FIG. 5 is a detailed flow (subroutine) of step S12 in FIG. 4. The flows in FIGS. 4 and 5 are executed by the debugging software implemented by the processing unit 200.

In step S11, reliability information is stored in storage means. The reliability information here is reliability information including the reliability of the individual indices of the classification items of the program, described above. The storage means corresponds to the storage means 210 (for example, the first storage section 212) in FIG. 2. In step S12, a reliable code area and an unreliable code area are determined. This determination step is executed also as an update step during debugging in later step S15.

Referring now to FIG. 5, in step S121, the reliability of the individual code areas is calculated on the basis of the reliability of the individual indices of the classification items called from the storage means. The method of calculation is as described above. In step S122, it is determined whether the reliability of the individual code areas is within a predetermined range. The predetermined range is as described above. If the determination is Yes, it is determined at step S123 that the code area is an unreliable code area. If the determination is No, it is determined at step 124 that the code area is in a reliable code area. In the update process, the determination for the code area is updated (maintained or changed). In step S125, the determined/updated reliability information is stored in the storage means (second storage section 214).

Returning to FIG. 4, in step S13, a debugging operation by the debugger 203 is performed. The debugging operation is as described above. In step S14, it is determined whether a change instruction has been issued from the user during debugging. This change instruction refers to an instruction to change the setting of reliability/code area during debugging. For example, this corresponds to the case where, if there is a problem in the process of execution, the reliability of the code area on the execution path until that time is decreased, or the setting of the code area (reliable or unreliable) is changed depending on the changed reliability, as described above.

If the determination in step S14 is Yes, the reliable code area and the unreliable code area are updated in step S15, as in the process in step S12 (FIG. 5). If the determination in step S14 is No or after the update in step S15, it is determined in step S16 whether the debugging execution path has ended. If the determination is Yes, the series of debugging ends, and if the determination is No, the process returns to step S13 and the debugging operation is repeated.

Next, an example of a graphical user interface (GUI) for supporting the debugging of a program, according to the present invention described above, will be described with reference to FIG. 6. This GUI is used in executing the debugging apparatus or the debugging method of the present invention described above. That is, this GUI is used to support, for example, the processing unit in determining a reliable code area and an unreliable code area for a target program by using reliability information including the reliability of the individual indices of the classification items of the program stored in the storage unit and in executing debugging of only the unreliable code area. The use of this GUI makes the debugging work of the user more efficient and further enhances the efficiency of the entire debugging.

Figure 6:
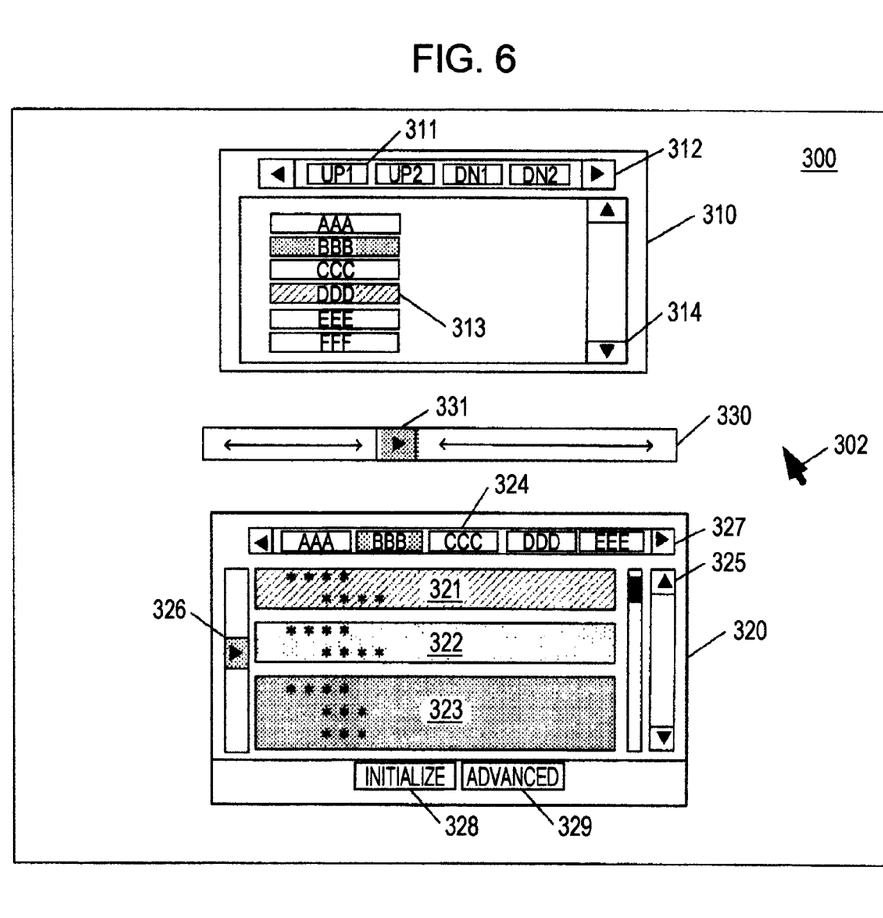
FIG. 6 is a diagram showing an example of a GUI of the present invention.

The GUI in FIG. 6 is displayed on a display screen of the display means 250 of the PC 20 in FIG. 2. Although FIG. 6 is shown only in black and white because of a restriction of the drawing, block display portions (313 and 321 to 323) and so on can actually be displayed in color with a shade. Icons displayed can be in any form, such as pictorial symbols, that can be used in various operating systems (Oss). The icons are selected by the operation of a mouse pointer 302 or a keyboard.

The GUI includes a display screen 300, a first window 310, a second window 320, and a slider display portion 330 on the display screen 300. The first window 310 displays a plurality of code names 313 on the execution path of the target program. Instead of the code names 313, path names may be directly displayed. Four icons 311 in the first window 310 are for increasing or decreasing the reliability of a selected code name (or path name), in which UP is used to increase the reliability, and DN is used to decrease the reliability.

More specifically, in the case where the reliability is set in units corresponding to individual Java® methods, the icons 311 can be set as an icon for increasing the reliability of a method that is stopped at the present and executing step-in, an icon for decreasing the reliability of the next method and executing step-in, and an icon for decreasing the reliability of the execution path until then and terminating the process. Scroll buttons 312 and 314 are used to scroll the reliability increasing and decreasing icons 311 and the code names (or path names) 313, respectively.

The second window 320 displays code areas corresponding to a code name selected from the plurality of code names (path names) 313 in the first window 310. FIG. 6 shows three code areas 321 to 323. A plurality of code is enumerated in the individual code areas 321 to 323. Icons 324 each represent a code name (or path name) corresponding to the displayed code areas. The icons 324 show the same names and abbreviations as the code names 313 in the first window 310.

Scroll buttons 325 and 327 are used to scroll the code areas 321 to 323 and the code names (or path names) 324, respectively. The scroll button 326 shows the present debugged position, and the code at the right of the button 326 is the present debugged code. An initialize icon 328 is for returning the setting of the reliability to an initial value and can return the reliability to the initial value in units of selected code area or in units of code name (or path name). An advanced setting icon 329 is used to set the setting of reliability with the slider display portion 330, described later in more detail, for example to directly input the value of reliability. When the advanced setting icon 329 is clicked on, an advanced setting menu is displayed as another window (not shown).

The slider display portion 330 is used to selectively change the color of the plurality of code names (or path names) 313 in the first window 310 or the code areas 321 to 323 displayed in the second window 320 depending on the reliability of the corresponding code name (or path name) or the code area. Specifically, the color and the light and shade of a selected one of the code names (or path names) 313 or code areas 321 to 323 can be changed by shifting a button 331 from side to side in the drawing.

For example, the reliability of a selected code name or code area increases and the color becomes dark as the button 331 moves to the right, and conversely, the reliability of the selected code name or code area decreases and the color becomes light as the button 331 moves to the left. In the case where the code name or code area has switched between the unreliable range and the reliable range in the course of shifting the button 331 to the right or left in the GUI, the color changes when the reliability of the code name or code area becomes above or below the lowest limit of the predetermined range, so that the user is informed that the reliability has changed. For example, the code area 321, which was in the reliable code area and was red, changes to blue to indicate an unreliable code area at a given time by sliding the button 331 to the right. The time (boundary) can be set as the boundary of the predetermined reliable range (for example, 75%), described above.

In summary, according to an embodiment of the present invention, since debugging of the target program is executed only for the unreliable code area as determined using the reliability of the individual indices of the classification items, the debugging time of the entire program can be reduced. In addition to storing reliability information comprising reliability of individual indices of classification items of the target program, reading the reliability information and determining a reliable code area and an unreliable code area using the reliability information, and debugging only the unreliable code area, an embodiment of the present invention may further comprise updating, for code on an execution path during the debugging, the reliable code area and the unreliable code area based on an instruction from a user. Furthermore, a defective, not defective, or seemingly defective code area can be re-examined as a reliable code area or an unreliable code area depending on the progress of debugging, thus allowing the debugging time to be reduced and the reliability of the debugging to be improved. Determining the reliable code area or the unreliable code area, and the updating thereof, may further comprise calculating the reliability of the individual code areas from the reliability of the individual indices of the classification items of the program and determining, if the reliability of a particular code area is within a predetermined range, that the particular code area is an unreliable code area. In addition, since the reliability of the individual code areas is calculated in accordance with the state of the target program, and if the calculated reliability of the individual code areas is within a predetermined range, the code area may be determined as an unreliable code area, the accuracy of the unreliable code area can be increased, and hence the debugging time can be reduced, and the reliability of debugging can be further improved.

Having described a specific embodiment of the present invention with reference to the drawings, it is our intention that the present invention not be limited to the described embodiment. It should also be understood that various changes, corrections, and modifications based on the knowledge of those skilled in the art may be made therein without departing from the spirit and scope of the invention.

The invention claimed is:

1. A method for debugging a target program with a computer including a storage unit and a processing unit, the method comprising:

storing, in the storage unit, reliability information including a reliability of individual indices of classification items associated with each of a plurality of code areas of a target program, wherein:

each of the code areas has having associated therewith a plurality of the individual indices; and the reliability of the individual indices of classification items associated with each of the plurality of code areas indicates importance of debugging the associated code area;

the processing unit reading the reliability information of the target program from the storage unit, then determining reliable code areas of the target program and unreliable code areas of the target program by using the reliability of the plurality of the individual indices associated with each of the individual code areas in the reliability information, for each of the plurality of code areas of the target program, wherein the determining comprises:

calculating a reliability of each of the individual code areas by computing a mathematical function using, as inputs, the reliability of the plurality of individual indices associated therewith; and determining that a selected one of the individual code areas is an unreliable code area if the calculated reliability for the selected one of the individual code areas is within a predetermined range and otherwise determining that the selected one of the individual code areas is a reliable code area; and the processing unit executing a debugger for debugging a specific execution path of the target program only for the unreliable code areas on the specific execution path and not for the reliable code areas on the specific execution path, the debugger performing steps comprising:

instructing the target program to execute a step-in;

after executing the step-in, automatically stopping the target program, by the debugger, at a breakpoint encountered on the specific execution path in the target program;

responsive to determining that the encountered breakpoint is in one of the reliable code areas, instructing the target program, by the debugger without input of a user, to automatically restart from the encountered breakpoint; and responsive to determining that the encountered breakpoint is in one of the unreliable code areas, performing:

increasing the reliability of the unreliable code area, in accordance with input of the user;

setting the unreliable code area as a newly-reliable code area along the specific execution path, based on the increased reliability;

updating the stored reliability information to reflect the increased reliability corresponding to the newly-reliable code area;

instructing the target program to execute a step-out from the newly-reliable code area; and automatically restarting the target program, by the debugger after the step-out, without input of the user.

2. The method according to claim 1, wherein the mathematical function comprises multiplication.

3. The method according to claim 1, wherein the mathematical function comprises addition of a weighting factor to a product of multiplying the inputs.

4. The method according to claim 1, wherein the predetermined range comprises a threshold value used to determine whether any code area is reliable or unreliable.

5. The method according to claim 1, wherein the classification items comprise at least two of:

whether the code area is a file in a changeset;

whether the code area is a source under edition in its own workspace;

whether the code area was changed after a specified date; and whether the code area was changed after a baseline.

6. An apparatus for debugging a target program, the apparatus comprising:

a memory storage unit comprising:

a first storage component that stores first reliability information including a reliability of individual indices of classification items associated with each of a plurality of code areas of a target program, wherein each of the code areas has associated therewith a plurality of the individual indices and the reliability of the individual indices of classification items associated with each of the plurality of code areas indicates importance of debugging the associated code area; and a second storage component that stores second reliability information including a calculated reliability of individual code areas; and a processing unit executing software instructions of a plurality of components, the components comprising:

a reliability calculating component that calculates the reliability of the individual code areas from the reliability of the plurality of the individual indices associated with each of the individual code areas and stored in the first storage component, wherein the calculating comprises, for each of the individual code areas, computing a mathematical function using, as inputs, the reliability of the plurality of individual indices associated therewith;

a determination component that determines, for the target program, reliable code areas and unreliable code areas depending on the reliability of the individual code areas in the second storage component, wherein each selected one of the individual code areas is determined to be an unreliable code area if the calculated reliability for the selected code area is within a predetermined range and otherwise is determined to be a reliable code area; and a debugger that executes debugging of the unreliable code areas on a specific execution path in the target program, the debugger omitting debugging of the reliable code areas on the specific execution path in the target program, the debugger further comprising instructions which are executable to implement functions comprising:

instructing the target program to execute a step-in;

after executing the step-in, automatically stopping the target program, by the debugger, at a breakpoint encountered on the specific execution path in the target program;

responsive to determining that the encountered breakpoint is in one of the reliable code areas, instructing the target program, by the debugger without input of a user, to automatically restart from the encountered breakpoint; and responsive to determining that the encountered breakpoint is in one of the unreliable code areas, performing:
    increasing the reliability of the unreliable code area, in accordance with input of the user;
    setting the unreliable code area as a newly-reliable code area along the specific execution path, based on the increased reliability;
    updating the stored reliability information to reflect the increased reliability corresponding to the newly-reliable code area;
    instructing the target program to execute a step-out from the newly-reliable code area; and automatically restarting target program, by the debugger after the step-out, without input of the user.

7. The apparatus according to claim 6, wherein the mathematical function comprises multiplication.

8. The apparatus according to claim 6, wherein the mathematical function comprises addition of a weighting factor to a product of multiplying the inputs.

9. The apparatus according to claim 6, wherein the predetermined range comprises a threshold value used to determine whether any code area is reliable or unreliable.

10. The apparatus according to claim 6, wherein the classification items comprise at least two of:
    whether the code area is a file in a changeset;
    whether the code area is a source under edition in its own workspace;
    whether the code area was changed after a specified date; and
    whether the code area was changed after a baseline.

* * * * *